Dec. 20, 1966  J. JOYCE  3,293,581
WIDE LINEAR RANGE INDUCTIVELY COUPLED SENSING DEVICE
Filed Aug. 10, 1960  4 Sheets-Sheet 2
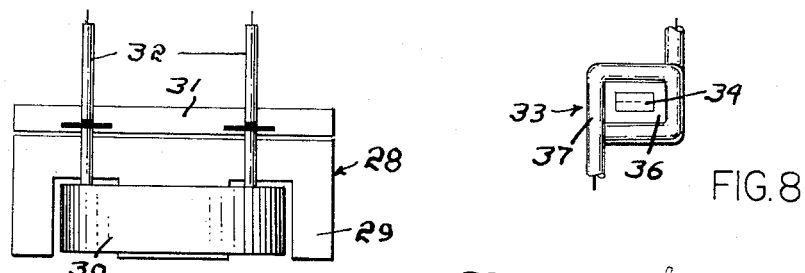
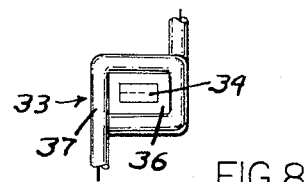
FIG. 8
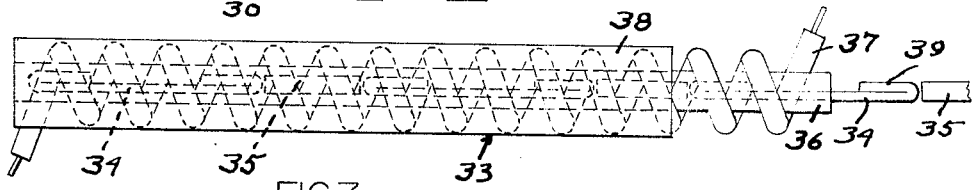
FIG. 7
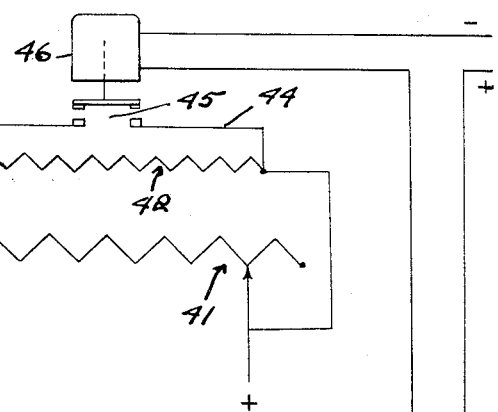
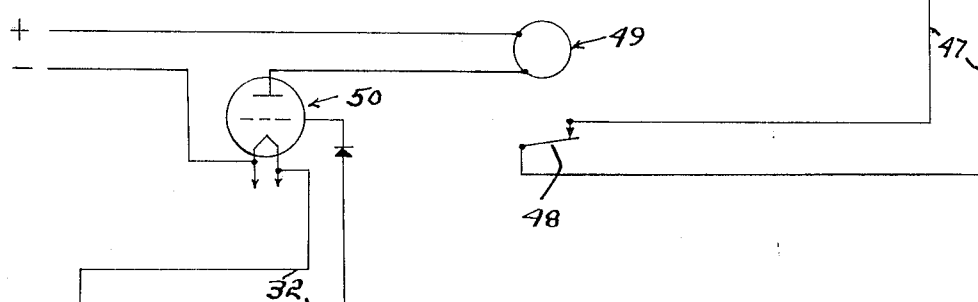
FIG. 9
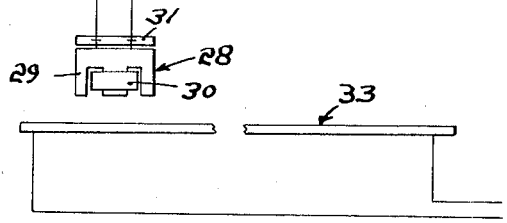
*INVENTOR.*
JOHN JOYCE
BY
*ATTORNEY*

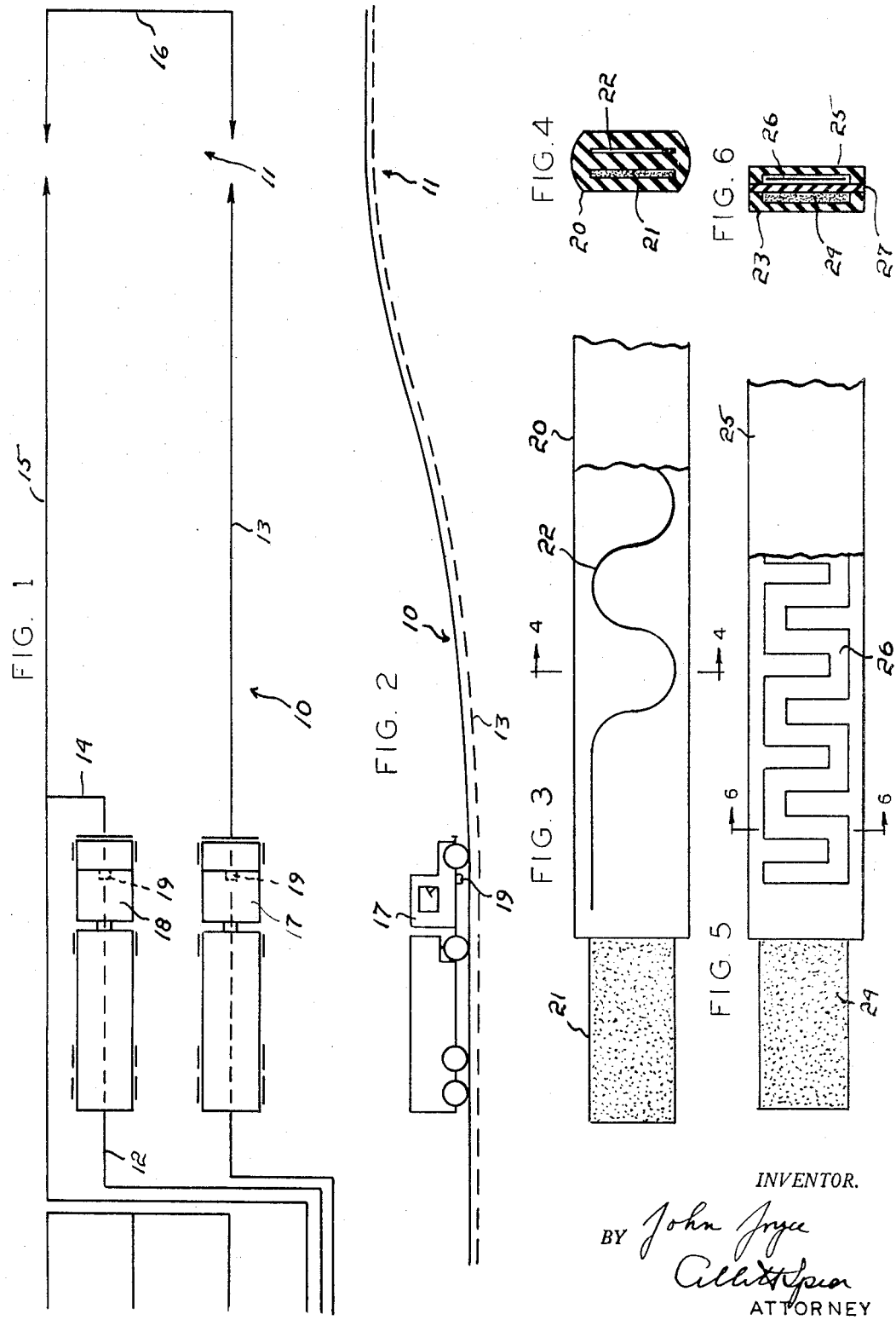

United States Patent Office 3,293,581
Patented Dec. 20, 1966

1

3,293,581
WIDE LINEAR RANGE INDUCTIVELY
COUPLED SENSING DEVICE
John Joyce, Milton, Mass., assignor to John Joyce, Inc.,
Milton, Mass, a corporation of Massachusetts
Filed Aug. 10, 1960, Ser. No. 48,784
2 Claims. (Cl. 336—119)

The present invention relates to inductive cables and to combinations including such cables and is a continuation-in-part of my copending application Serial No. 667,-782, filed June 25, 1957, now abandoned.

There are many uses of inductive cables in accordance with the invention. One field of use is the automatic control of vehicular traffic as disclosed in my copending application Serial No. 617,350, filed October 22, 1956, now abandoned, where inductive couples are employed to ensure safety under adverse operating conditions.

The general objective of the present invention is to provide means by which there is an induced current flow between a member in a vehicle circuit that has a magnetic field, at least when current is flowing through it, and a cable associated with the path of that vehicle. Either the vehicle circuit or the cable has a source of electrical energy connected thereto and the induced current is used, for example, to operate or control the operation of safety devices.

Such a magnetic couple has marked advantages over circuitry requiring direct contact between a moving contact member and a rail since the latter is often defeated by intervening foreign matter such, for example, as sand on the rails. The former, however, must be strong enough to ensure that the induced current is continuously adequate to operate whatever devices are in its circuit.

In accordance with the invention, the objective of strength of the magnetic couple is attained by cable construction each provided with a magnetic portion, a conductor portion, and means insulating the portions from each other. The conductor portion is wave-shaped with respect to the magnetic portion and to the field and path of the member in the vehicle circuit which member may be a coil, another similar cable, a permanent magnet, or an electro-magnet and the conductor portion may be variously formed as for example, from a flat sheet or by a coil about the magnetic portion. The magnetic portion may also be variously formed but preferably consists of a series of spaced magnetic members.

In the accompanying drawings, there are shown illustrative embodiments of the invention from which other objectives, and other of its novel features and advantages will be readily apparent.

In the drawings:

FIG. 1 is a schematic plan view of an installation in accordance with the invention;

FIG. 2 is a like side view of the installation shown in FIG. 1;

FIG. 3 is a fragmentary elevation of one embodiment of the invention;

FIG. 4 is a section taken along the indicated lines 4—4 of FIG. 3;

FIG. 5 is a view, similar to FIG. 3, of another embodiment of the invention;

FIG. 6 is a section taken along the indicated lines 6—6 of FIG. 5,

FIG. 7 is a side elevation of another cable in accordance with the invention and the member of the vehicle that is magnetically coupled thereto, FIG. 8 is an end view of the cable shown in FIG. 7, FIG. 9 is a schematic view of the cable, the vehicle

Figure 10:
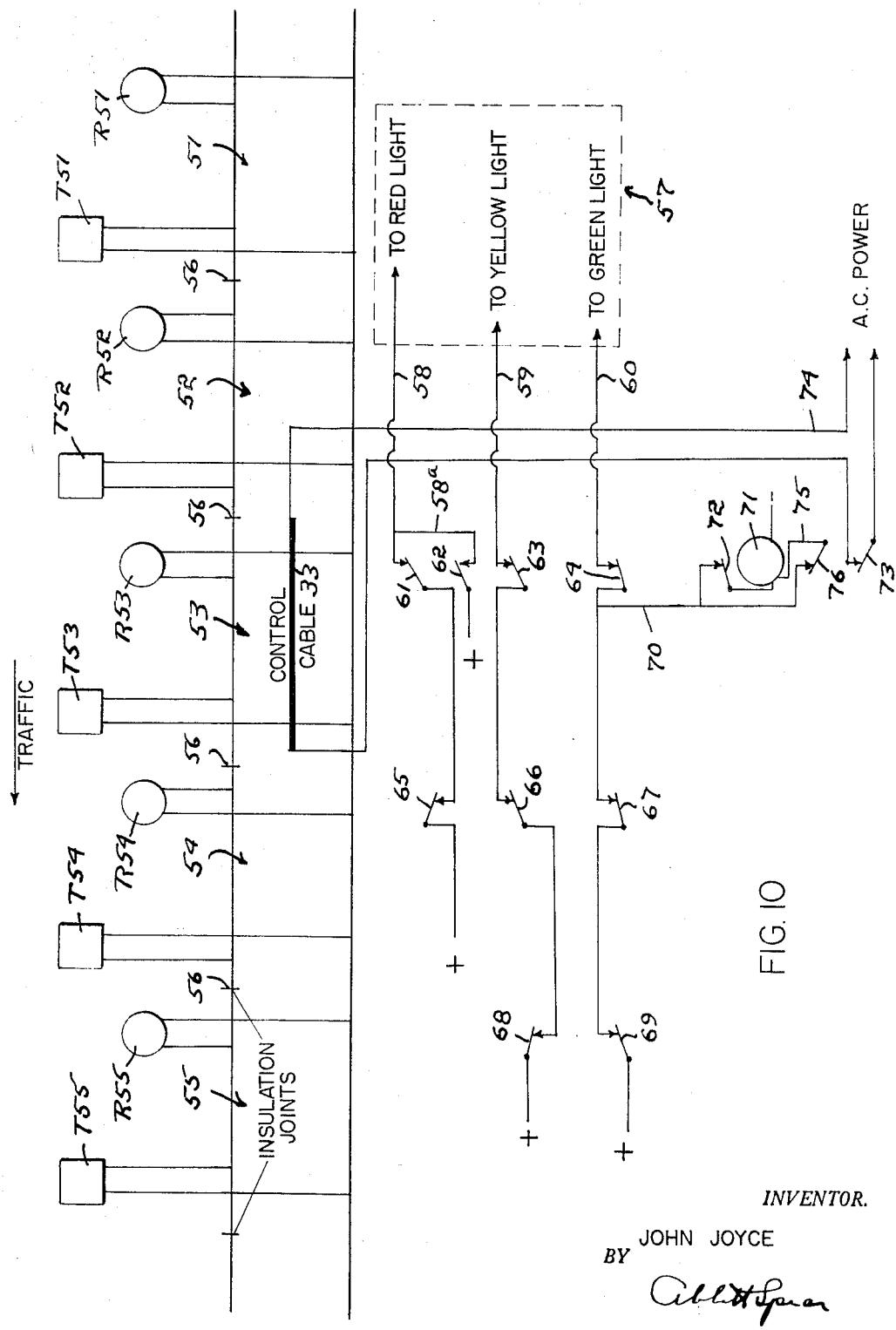
Figure 11:
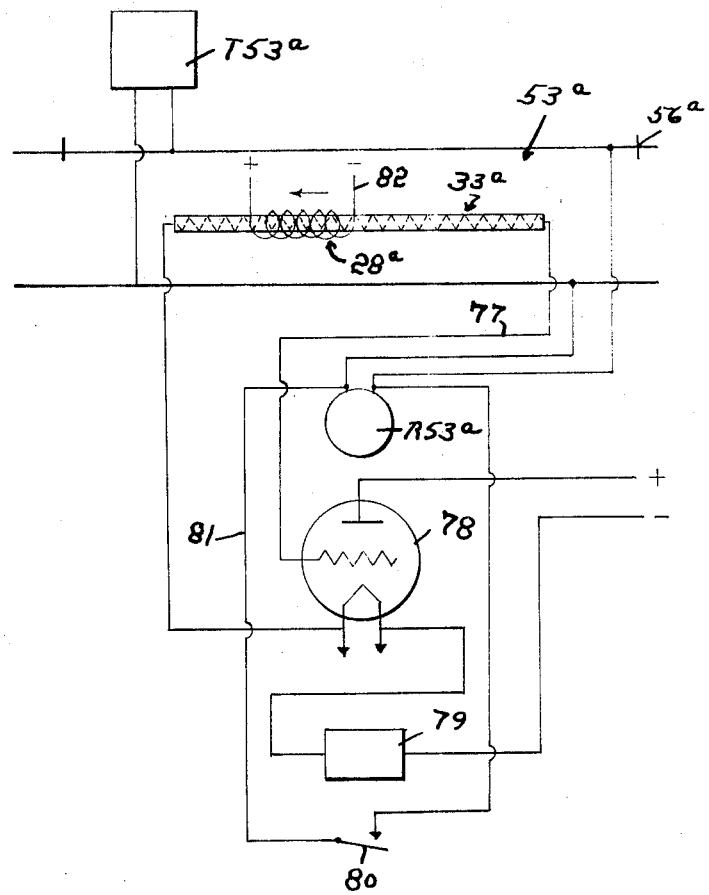

2 circuit and safety circuitry controlled thereby in response to current induced in the vehicle circuit, FIG. 10 is a schematic view illustrating an installation utilizing the invention, and FIG. 11 is a schematic view illustrating a typical use of the invention when the current is induced in the cable as the vehicle moves along its track.

As illustrative of uses of inductive cables in accordance with the invention, there is indicated a highway 10 including a hill 11. The highway 10 has parallel inductive cables 12 and 13 embedded therein with the cable 12 connected as at 14 to the return cable 15 at the foot of the hill 11, and the cable 13 connected as at 16 to the return cable 15 at some remote point which might be an intersection or other zone where positive safety precautions are desirable.

Each of the trucks 17 and 18 is shown as having a control 19 which may be assumed to permit high speed operation only as long as it is in inductive contact with one of the cables 12, 13. The truck 17 has its control in inductive contact with the cable 13 so that it may continue up the hill at a high speed. The truck 18 has its control in inductive contact with the cable 12 which terminates at the foot of the hill 11 so that the truck 18 can thereafter proceed only at low speed until its control 19 is again energized by the truck 18 pulling over to the right behind the truck 17 until its control is in inductive contact with the cable 13. Details of vehicles and control circuits are shown in the above identified application Serial No. 617,350.

As one example of an inductive cable in accordance with the invention, reference is made to the embodiment of FIGS. 3 and 4 in which there is shown an extruded sheath of insulation 20 encasing, in spaced relationship, a flexible magnetic portion 21 and wave-shaped conductor 22. The sheath may be of any synthetic material. Polyvinyl chloride, neoprene, or the equivalent are well adapted for use.

In FIGS. 5 and 6, there is shown another embodiment of the invention consisting of a section 23 of insulation in which the flexible magnettic portion 24 is embedded, a section 25 of insulation in which the conductor 26, shown as having waves of rectangular shape, is embedded, and a central section 27 of insulation to which the other sections are sealed.

It will be noted that the counter 26 may be die-cut and that the sections are separate and may be formed as extrusions. A series of sections 23 may be made, each having its magnetic portion 24 of a different density and used with any one of a series of sections 25 with the conductors of each having a different number of waves per foot, waves of different amplitude, or both, thus to enable cables of a wide range of desired characteristics to be made.

In FIG. 7 a generally indicated member 28 includes a yoke 29 supporting an electro-magnet 30 and a capacitor 31 in the vehicle circuit 32.

The member 28 is spaced above the control cable 33 which, although it may be any of the previously described cables, is shown as consisting of a core comprising a series of spaced magnetic portions 34 with a spacer 35 of non-magnetic stock between the proximate ends of each two portions 34. The core is encased in a body of insulating material as at 36 and a circuit wire 37 is coiled about the insulated core and is itself encased in a suitable insulating cover 38. While the magnetic portions 34 may be otherwise formed, they are shown as elongated elements having their ends 39 doubled over towards each other. It will be noted the member 28 is dimensioned so that its magnetic field is greater than the distance the magnetic portions 34 are spaced apart.

A typical use of the invention is illustrated by FIG. 9 wherein there is indicated a vehicle propulsion motor 40 having a speed regulator 41 and a resistor 42 in its field circuit 43. The field circuit 43 is also provided with a shunt 44 for the resistor 42 and having a normally open switch 45 closed when the solenoid 46 in the circuit 47 is energized by the closing of the normally open switch 48 of the relay 49.

When the current is flowing through the control cable 33 at a frequency to which the member 28 is tuned, the current induced in the coil 30 of the member 28 puts a positive potential on the grid of a power control tube 50 so that the relay 49 is energized to open the circuit 47 thus to place the resistor 42 in service. With the resistor 42 in service, a higher vehicle speed is possible.

In FIG. 10 further details of an illustrative use of the invention are shown and presupposes a vehicle equipped in accordance with FIG. 9 to be moving to the left in track section 52 and approaching track section 53. The several track sections are insulated from each other as at 56 and there is a separate control cable 33 for each track section and extending for the full length thereof.

Each track section is also a track circuit as it has a transformer connected thereto and includes a relay. The transformers for the track sections 51, 52, 53, 54, and 55 are indicated at T51, T52, T53, T54, and T55, respectively, and their relays are indicated at R51, R52, R53, R54, and R55, respectively. Each track section is also provided with a signal but to simplify the drawings, only the signal 57 for the track section 53 is shown. The signal 57 has a red light circuit 58, a yellow light circuit 59, and a green light circuit 60. The signal circuits receive current from a wayside source, not shown.

Each track relay has a series of switches but only those that affect the operation of the signal 57 are shown in FIG. 10. The switches of the relay R43 that are concerned with the circuits to the signal 57 comprise a switch 61 in the red light circuit 58 closed when its relay is energized, a switch 62 in a lead 58ª connected to the red light circuit 58 and closed when the relay is deenergized a switch 63 in the yellow light circuit 59 closed when its relay is energized, and a switch 64 in the green light circuit 60 closed when its relay is energized.

Each relay also has switches for certain other signal circuits and these that are concerned with the circuits to the signal 57 are illustrated in connection with the track relays R54 and R55. The relay R54 has a switch 65 in the red light circuit of the signal 57 and this switch is closed when the relay R54 is deenergized. In addition, the relay R54 has switches 66 and 67 in the yellow and green light circuits, respectively, of the signal 57 and these switches are closed when the relay R54 is energized.

The relay R55 is shown as having a switch 68 in the yellow light circuit 59 closed when the relay R55 is deenergized and a switch 69 in the green light circuit 60 which is closed when the relay R55 is energized. It will be understood that all the relays have all of the above identified switches where signals like the signal 57 are employed and are to be controlled through the same number of track sections.

If a vehicle is already in track section 53, its wheels have, as is conventional, served to shunt the relay R53 out of service so that, of the switches controlling the circuits to the signal 57, the switch 62 is closed, completing the red light circuit 58, and the switches 61, 63, and 64 are open.

If no vehicle is in the track section 53 but there is one in the track section 54, the relay R53 is energized and the relay R54 is deenergized. The red light circuit 58 is now closed by the switch 65 and the switch 61 and the yellow and green light circuits are open since the switches 66 and 67 are both open.

With a red light at signal 57, the operator stops. When the vehicle has moved from track section 54 into track section 55, the relay R54 is again energized and the relay R55 is deenergized so that switch 68 closes and the switch 69 opens. The yellow light circuit 59 is now completed as switches 68, 66, and 63 are all closed. The red light circuit switch 65 is now open. The operator could now proceed into the track section 53 but the vehicle could only be moved at a slow speed as the field resistor 42 is shunted out allowing a strong field current flow and a reduced speed of the motor 40 and of the vehicle. On entry into the track section 53, relay R53 is again shunted out again to close the red light circuit 58.

If track sections 53, 54, and 55 were all clear of traffic, then relays R53, R54, and R55 would be energized. The switches 65 and 62 of the red light unit would then be open, as would the switch 68 of the yellow light circuit but the switch 69 would then be closed along with switches 67 and 64 thus to complete the green light circuit 60.

When the green light circuit 60 is closed, current flows through the lead 70 to a control relay 71 and provided with a switch 72 closed when the relay R53 is energized. The control relay 71 also includes a switch 73, closed when it is energized, in a circuit 74 to the cable 33 from a suitable source of A.C. current (not shown). As the relay R53 is shunted out by the entry of the vehicle into the track section 53, a holding circuit 75 is provided that has a switch 76 which is closed by the control relay 71 when it is energized. The holding circuit 75 is opened whenever the green light circuit is opened by the switch 67.

If the vehicle now enters track section 53, the vehicle member 28 now becomes magnetically coupled with the cable 33 and the induced current puts a positive potential on the grid of the tube 50 energizing the relay 49 and closing the circuit 47, thus to remove the shunt from the motor field circuit 43. A faster vehicle speed is now permitted.

In FIG. 10, the track section relays are shunted out by the vehicle wheels. As sand on the rails sometimes prevents shunting, the arrangement illustrated by FIG. 11 has marked advantages.

In FIG. 11, a track section 53ª is insulated from other track sections as at 56ª and has a wayside transformer T53ª supplying current to a relay R53ª through the rails of that section. The track section 53ª has a cable 33ª extending from end-to-end thereof and is part of a circuit 77 to a power control tube 78 and including a relay 79 controlling a switch 80 in a shunt 81 for the relay R53ª.

When a vehicle having a member 28ª in a vehicle circuit 82 from a suitable A.C. source enters the track section 53ª, a magnetic couple with the cable 33ª results. The current induced in the cable 33ª puts a positive potential on the grid of the power control tube 78 energizing the relay 79 thus to render the shunt effective without any chance of failure due to foreign matter between the member 28ª and the cable 33ª.

From the foregoing, it will be apparent that the present invention is adapted to a wide range of uses as a strong magnetic couple is ensured.

I claim:

1. In combination, first and second circuits, said first circuit including a first member having a magnetic field at least when current is flowing therethrough, said second circuit including a cable member extending in spaced relation to the field of said first member and to its path, said cable member including a lengthwise core comprising a series of spaced magnetic portions, a conductor portion in the form of a coil about said core, and means insulating said portions from each other, one of said members being movable relative to the other and one of said circuits including a current source, said relative movement being attended by an induced current in the other circuit.

2. An inductive cable comprising an axial core including a series of magnetic elements, each in the form of an elongated member having its ends disposed towards each other, and spacers of non-magnetic stock between said elements, a circuit including a portion disposed in a wave-shaped manner and having transverse sections that are substantially flat, parallel, and co-planar with respect to the core, and means insulating said core from said wave-shaped portion.

References Cited by the Examiner

UNITED STATES PATENTS

| 995,588 | 6/1911 | Cuntz | 178—45 |
|---|---|---|---|
| 2,365,632 | 12/1944 | Fisher | 310—14 |
| 2,447,212 | 8/1948 | Shoeppel | 336—118 |
| 2,567,394 | 9/1951 | Nuttman | 336—233 |
| 2,651,762 | 9/1953 | Snow | 336—129 |
| 2,762,984 | 9/1956 | Berkley | 336—30 |

MILTON O. HIRSHFIELD, *Primary Examiner.*

ORIS L. RADER, S. A. ROEN, C. W. DAWSON, D. F. DUGGAN, *Assistant Examiners.*